United States Patent
Sugino et al.

(10) Patent No.: US 8,580,207 B2
(45) Date of Patent: Nov. 12, 2013

(54) HOLDING SEALING MATERIAL, EXHAUST GAS PURIFYING APPARATUS, AND METHOD FOR MANUFACTURING HOLDING SEALING MATERIAL

(75) Inventors: Junichi Sugino, Ogaki (JP); Tsutomu Yamazaki, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 718 days.

(21) Appl. No.: 12/413,044

(22) Filed: Mar. 27, 2009

(65) Prior Publication Data
US 2009/0257925 A1 Oct. 15, 2009

(30) Foreign Application Priority Data
Apr. 15, 2008 (JP) ................. 2008-105834

(51) Int. Cl.
*B01D 50/00* (2006.01)
(52) U.S. Cl.
USPC ........................................ 422/179
(58) Field of Classification Search
USPC .................. 422/177, 179, 180
See application file for complete search history.

(56) References Cited

U.S. PATENT DOCUMENTS

| | | | |
|---|---|---|---|
| 5,380,580 A * | 1/1995 | Rogers et al. ............. 428/219 |
| 6,960,386 B2 | 11/2005 | Agata |
| 2003/0049180 A1 | 3/2003 | Fukushima |
| 2004/0022699 A1 | 2/2004 | Fukushima |
| 2004/0052694 A1 | 3/2004 | Nishikawa et al. |
| 2004/0134172 A1* | 7/2004 | Kumar et al. .............. 55/523 |
| 2004/0234428 A1* | 11/2004 | Tanahashi et al. .......... 422/180 |
| 2005/0175514 A1* | 8/2005 | Ohno ....................... 422/177 |
| 2006/0154040 A1* | 7/2006 | Merry ................... 428/292.1 |
| 2006/0278323 A1* | 12/2006 | Eguchi .................... 156/62.6 |
| 2007/0140929 A1* | 6/2007 | Watanabe et al. .......... 422/179 |
| 2007/0207069 A1 | 9/2007 | Kariya et al. |
| 2007/0231222 A1 | 10/2007 | Okabe |
| 2007/0292318 A1 | 12/2007 | Andoh et al. |
| 2008/0044317 A1 | 2/2008 | Kariya et al. |
| 2008/0047638 A1 | 2/2008 | Sugino |
| 2008/0178566 A1 | 7/2008 | Okabe |
| 2008/0181831 A1 | 7/2008 | Okabe |
| 2008/0312071 A1 | 12/2008 | Nishikawa et al. |
| 2009/0049690 A1 | 2/2009 | Eguchi |
| 2009/0072498 A1 | 3/2009 | Tanahashi et al. |

(Continued)

FOREIGN PATENT DOCUMENTS

| | | |
|---|---|---|
| CN | 1128923 | 11/2003 |
| CN | 1732331 | 2/2006 |

(Continued)

OTHER PUBLICATIONS

Chinese Office Action for corresponding CN Application No. 200910130130.6, Nov. 17, 2010.

(Continued)

*Primary Examiner* — Tom Duong
(74) *Attorney, Agent, or Firm* — Ditthavong Mori & Steiner, P.C.

(57) ABSTRACT

A holding sealing material includes a mat body. The mat body includes a first inorganic fiber and a second inorganic fiber. The first inorganic fiber contains about 60% by weight or more of alumina. The second inorganic fiber contains about 67% by weight or more of silica. The first inorganic fiber and the second inorganic fiber are in a mixed state.

24 Claims, 5 Drawing Sheets

(56) References Cited

U.S. PATENT DOCUMENTS

| | | |
|---|---|---|
| 2009/0075812 A1 | 3/2009 | Tanahashi et al. |
| 2009/0081442 A1 | 3/2009 | Tanahashi et al. |
| 2009/0081455 A1 | 3/2009 | Mitani |
| 2009/0084268 A1 | 4/2009 | Saiki |
| 2009/0087352 A1 | 4/2009 | Okabe |
| 2009/0087353 A1 | 4/2009 | Saiki |
| 2009/0114097 A1 | 5/2009 | Saiki |
| 2009/0148356 A1 | 6/2009 | Okabe |

FOREIGN PATENT DOCUMENTS

| | | |
|---|---|---|
| DE | 19803063 | 7/1999 |
| EP | 1867847 | 12/2007 |
| EP | 1892393 | 2/2008 |
| EP | 1905895 | 4/2008 |
| EP | 1908934 | 4/2008 |
| JP | 10-288032 | 10/1998 |
| JP | 2002-156083 | 5/2002 |
| JP | 2003-129832 | 5/2003 |
| JP | 2004-204819 | 7/2004 |
| JP | 2005-074243 | 3/2005 |
| JP | 2006-501402 | 1/2006 |
| JP | 2006-223920 | 6/2006 |
| JP | 2007-132240 | 5/2007 |
| JP | 2007-162583 | 6/2007 |
| JP | 2007-205307 | 8/2007 |
| JP | 2007218221 A * | 8/2007 |
| JP | 2008-080756 | 4/2008 |
| WO | WO 99/25964 | 5/1999 |
| WO | WO 00/75496 | 12/2000 |
| WO | WO 2004/061279 | 7/2004 |

OTHER PUBLICATIONS

XP002519752—"UNIFRAX Fibermax® Mat", Jul. 2006, UK.
Chinese Office Action for corresponding CN Application No. 200910130130.6, Apr. 20, 2011.

* cited by examiner

A-A line cross-sectional view

FIG. 6

HOLDING SEALING MATERIAL, EXHAUST GAS PURIFYING APPARATUS, AND METHOD FOR MANUFACTURING HOLDING SEALING MATERIAL

CROSS-REFERENCE TO RELATED APPLICATIONS

The present application claims priority under 35 U.S.C. §119 to Japanese patent application No. 2008-105834, filed Apr. 15, 2008, the contents of which are incorporated herein by reference in their entirety.

BACKGROUND OF THE INVENTION

1. Field of the Invention

The present invention relates to a holding sealing material, an exhaust gas purifying apparatus, and a method for manufacturing a holding sealing material.

2. Discussion of the Background

Particulate matter (hereinafter, also referred to as "PM") contained in exhaust gases discharged from internal combustion engines such as diesel engines has raised serious problems as contaminants harmful to the human body. Also, harmful gas components such as CO, HC or NOx contained in exhaust gases have raised problems as contaminants harmful to the environment and the human body.

In light of those problems, as an exhaust gas purifying apparatus which is connected to the internal combustion engine to capture PM in exhaust gases or which converts toxic gas components such as CO, HC and NOx contained in exhaust gases, there are disclosed a variety of exhaust gas purifying apparatuses including an exhaust gas treating body including a porous ceramic such as cordierite or silicon carbide, a casing to accommodate the exhaust gas treating body inside thereof, and a holding sealing material disposed between the exhaust gas treating body and the casing.

Those holding sealing materials mainly include inorganic fibers. The exhaust gas treating body is held by the effect of elasticity of the inorganic fibers so that the exhaust gas treating body is prevented from coming off due to pressures applied by the exhaust gasses.

In these days, internal combustion engines are operated at an air fuel ratio close to the theoretical air fuel ratio for the purpose of improvement in fuel consumption, and thus temperatures of the exhaust gases are likely to be high. Particularly, when internal combustion engines are driven at a range of high rotational rates, the temperature of exhaust gases immediately after emitted from the combustion engine may rise to as high as about 1000° C. Therefore, the high temperature exhaust gases reaching to the exhaust gas purifying apparatus may increase the temperature of the exhaust gas purifying apparatus to a high temperature.

Therefore, the holding sealing material forming one component of the above-mentioned exhaust gas purifying apparatus is required not to be damaged by erosion loss and the like even under a high temperature condition at about 1000° C.

As a holding sealing material for use under a high temperature condition, there is proposed a holding sealing material using inorganic fibers (hereinafter also simply referred to as alumina fiber) mainly containing alumina.

Generally, among inorganic fibers, the alumina fiber has a relatively high heat resistance and high wind erosion resistance but has a low elasticity. Accordingly, the holding sealing material including only alumina fibers has low properties of holding the exhaust gas treating body (hereinafter simply also refers to as holding properties). Therefore, in order to provide the holding sealing material including only alumina fiber with high holding properties, a large amount of the alumina fiber needs to be used.

It is to be noted that the alumina fiber is relatively expensive among inorganic fibers. Therefore, in the case of the holding sealing material using a large amount of alumina fiber, the holding sealing material becomes expensive. As a result, the exhaust gas purifying apparatus using such a holding sealing material may become expensive.

In order to solve those problems, for example, there is disclosed a holding sealing material including inorganic fibers mainly containing heat-treated silica (hereinafter also simply referred to as silica fiber) (JP-T 2006-501402)

Further, there is proposed a holding sealing material including two inorganic fiber layers of an alumina fiber layer and an inorganic fiber layer mainly including alumina and silica (hereinafter, the inorganic fiber layer is also simply referred to as ceramic fiber) (JP-A 2004-204819).

The holding sealing material disclosed in JP-T 2006-501402 includes silica fibers whose elasticity has been improved by heating the silica fiber that is relatively inexpensive among inorganic fibers.

The holding sealing material disclosed in JP-A 2004-204819 includes two inorganic fiber layers of the alumina fiber layer and the ceramic fiber layer. The holding sealing material is said to have wind erosion resistance as the same with the holding sealing material including only alumina fibers.

The content of JP-T 2006-501402 and JP-A 2004-204819 are incorporated herein by reference in their entirety.

SUMMARY OF THE INVENTION

According to one aspect of the present invention, a holding sealing material includes a mat body. The mat body includes a first inorganic fiber and a second inorganic fiber. The first inorganic fiber contains about 60% by weight or more of alumina. The second inorganic fiber contains about 67% by weight or more of silica. The first inorganic fiber and the second inorganic fiber are in a mixed state.

According to another aspect of the present invention, an exhaust gas purifying apparatus includes an exhaust gas treating body, a casing, and a holding sealing material. The exhaust gas treating body has a longitudinal direction and cell walls extending along the longitudinal direction to define cells. The casing accommodates the exhaust gas treating body. The holding sealing material is provided between the exhaust gas treating body and the casing to hold the exhaust gas treating body. The holding sealing material has a mat body and includes a first inorganic fiber and a second inorganic fiber. The first inorganic fiber contains about 60% by weight or more of alumina. The second inorganic fiber contains about 67% by weight or more of silica. The first inorganic fiber and the second inorganic fiber are in a mixed state.

According to further aspect of the present invention, a method for manufacturing a holding sealing material includes preparing a mixed solution containing an alumina fiber and a silica fiber. Water in the mixed solution is removed through a mesh to produce a mat precursor. The mat precursor is heated and compressed to manufacture a mat body.

According to the other aspect of the present invention, a method for manufacturing a holding sealing material includes preparing a first mixed solution containing an alumina fiber and a silica fiber. Water in the first mixed solution is removed through a mesh to produce a first mat precursor. A second mixed solution is prepared containing an alumina fiber and a silica fiber. The alumina fiber is less contained in the second mixed solution than in the first mixed solution. Water in the second mixed solution is removed through a mesh to produce a second mat precursor. The first mat precursor is laminated on the second mat precursor to produce laminated mat precursors. The laminated mat precursors are heated and compressed to manufacture a laminated mat body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Embodiments will now be described with reference to the accompanying drawings, wherein like reference numerals designate corresponding or identical elements throughout the various drawings.

A holding sealing material according to an embodiment of the present invention has a mat-like body and includes: a first inorganic fiber mainly containing alumina; and a second inorganic fiber mainly containing silica, the first inorganic fiber and the second inorganic fiber being in a coexisting state.

The first inorganic fiber contains about 60% by weight or more of alumina or preferably about 70% by weight or more of alumina. The second inorganic fiber contains about 67% by weight or more of silica or preferably about 90% by weight or more of silica.

It is to be noted that the first inorganic fiber and the second inorganic fiber may contain, for example, alkaline earth metal oxides such as MgO and CaO; metallic oxides such as $ZrO_2$ and $Cr_2O_3$, and the like in addition to alumina or silica.

The holding sealing material according to the embodiment of the present invention having the above-mentioned configuration is more likely to exert high wind erosion resistance that cannot be achieved by conventional holding sealing materials, is more likely to have high holding properties, and is more likely to be provided inexpensively.

The holding sealing material will be described below by using a figure.

Figure 1:
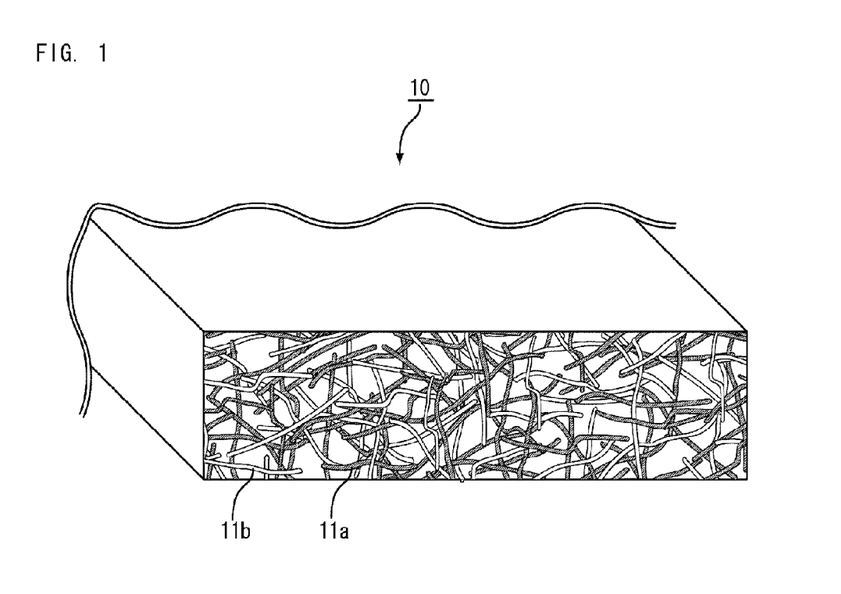
FIG. 1 is a partial cross-sectional perspective view schematically illustrating a cross-section obtained when the holding sealing material according to one embodiment of the present invention is cut along the thickness direction.

FIG. 1 is a partial cross-sectional perspective view schematically illustrating a cross-section obtained when the holding sealing material according to one embodiment of the present invention is cut along the thickness direction.

A holding sealing material 10 according to the embodiment of the present invention shown in FIG. 1 has an almost rectangular flat plate shape in plain view with a predetermined thickness. The following description will discuss the internal configuration of the holding sealing material 10 according to an embodiment of the present invention, and the other configurations of the holding sealing material 10 will be described later in descriptions of a first embodiment.

As shown in FIG. 1, the holding sealing material 10 according to the embodiment of the present invention mainly includes the first inorganic fiber 11a (alumina fiber) and the second inorganic fiber 11b (silica fiber). The first inorganic fiber 11a and the second inorganic fiber 11b are intricately intertwined with each other over the holding sealing material 10 as a whole.

The holding sealing material 10 according to the embodiment of the present invention includes the first inorganic fiber 11a and the second inorganic fiber 11b in a coexisting state as mentioned earlier.

Generally, alumina fiber has a higher wind erosion resistance than that of silica fiber, but the elasticity of the alumina finer is low. On the other hand, silica fiber has a higher elasticity than that of alumina fiber, but the wind erosion resistance is lower than that of the silica fiber.

For this reason, when a holding sealing material is formed by a layer made of only alumina fiber and a layer made of only silica fiber, since the elasticity of the layer made of only alumina fiber is low, and the wind erosion resistance of the layer made of only silica fiber is low, the resulting holding sealing material as a whole has low wind erosion resistance and low holding properties.

However, as described earlier, the holding sealing material 10 according to the embodiment of the present invention includes the first inorganic fiber 11a and the second inorganic fiber 11b in a coexisting state.

Therefore, the low wind erosion resistance of the second inorganic fiber 11b alone is compensated by the coexisting first inorganic fiber 11a having high wind erosion resistance so that the wind erosion resistance of the holding sealing material 10 as a whole can be reinforced.

Accordingly, the holding sealing material according to an embodiment of the present invention is more likely to exert high wind erosion resistance.

Further, the low elasticity of the first inorganic fiber 11a alone is compensated by the coexisting second inorganic fiber having high elasticity. Accordingly, unlike a conventional holding sealing material which requires a large amount of inorganic fibers to provide the holding sealing material with high holding properties, the holding sealing material 10 according to the embodiment of the present invention is more likely to exert high holding properties without using a large amount of the first inorganic fiber 11a and the second inorganic fibers 11b. Moreover, since it is not necessary to use a large amount of the first inorganic fiber 11a and the second inorganic fiber 11b to provide the holding sealing material 10 with high holding properties, the holding sealing material 10 is more likely to be provided inexpensively.

In the holding sealing material according to the embodiment of the present invention, a ratio of an amount of the first inorganic fiber relative to a total amount of the first inorganic fiber and the second inorganic fiber is desirably from about 25% by weight to about 75% by weight. In the holding sealing material according to the embodiment of the present invention, a ratio of the amount of the first inorganic fiber relative to the total amount of the first inorganic fiber and the second inorganic fiber falls within the above-mentioned range, and therefore the holding sealing material according to the embodiment of the present invention is especially suited to enjoy the effects of the present invention.

In the case where the ratio of the first inorganic fiber is about 75% by weight or less, the amount of the first inorganic fiber having high wind erosion resistance does not become too large and the amount of the second inorganic fiber having high elasticity does not become too small. As a result, the wind erosion resistance of the holding sealing material as a whole is more likely to be secured and the holding properties of the holding sealing material as a whole are more likely to be secured.

On the other hand, in the case where the ratio of the first inorganic fiber is about 25% by weight or more, the amount of the second inorganic fiber having high elasticity does not become too large and the amount of the first inorganic fiber having high wind erosion resistance does not become too small. As a result, the elasticity of the holding sealing material as a whole is more likely to be secured and the wind erosion resistance of the holding sealing material as a whole is more likely to be secured.

In the holding sealing material according to the embodiment of the present invention, a weight percent of the first organic fiber in a surface area of a first main surface of the holding sealing material is desirably larger than a weight percent of the first organic fiber in a surface area of a second main surface of the holding sealing material.

In the present specification, the surface area refers to an area from the first main surface (second main surface) of the holding sealing material to about 50% of a length in its thickness direction of the holding sealing material.

The holding sealing material according to the embodiment of the present invention has the surface area of the first main surface in which the amount of the first inorganic fiber (alumina fiber) included therein is larger than the amount of the first inorganic fiber included in the surface area of the second main surface.

In this kind of the holding sealing material according to the embodiment of the present invention, since heat resistant temperature of alumina fiber is generally higher than that of silica fiber, the surface area of the first main surface has a superior heat resistance to that of the surface area of the second main surface.

Accordingly, when using the holding sealing material according to the embodiment of the present invention for an exhaust gas purifying apparatus, damages such as erosion loss of the holding sealing material are more likely to be prevented from occurring by disposing the first main surface on the side of the exhaust gas treating body where the temperature becomes high due to influx of exhaust gases.

The exhaust gas purifying apparatus according to the embodiment of the present invention includes: an exhaust gas treating body having a longitudinal direction and cell walls extending along the longitudinal direction to define cells; a casing configured to accommodate the exhaust gas treating body; and a holding sealing material provided between the exhaust gas treating body and the casing and configured to hold the exhaust gas treating body, wherein the holding sealing material has a mat-like body and includes a first inorganic fiber mainly containing alumina; and a second inorganic fiber mainly containing silica, the first inorganic fiber and the second inorganic fiber being in a coexisting state.

In the exhaust gas purifying apparatus according to the embodiment of the present invention, a holding sealing material is provided between the exhaust gas treating body and the casing. The holding sealing material is more likely to exert a higher wind erosion resistance and also higher holding properties than those of a conventional holding sealing material without using a large amount of the first inorganic fiber and the second inorganic fiber.

For this reason, in the exhaust gas purifying apparatus according to the embodiment of the present invention, the holding sealing material is less susceptible to wind erosion.

Therefore, coming-off of the exhaust gas treating body is more likely to be prevented from occurring in the exhaust gas purifying apparatus according to the embodiment of the present invention. Moreover, since the exhaust gas purifying apparatus is provided with the holding sealing material which is more likely to exert high holding properties without using a large amount of the first inorganic fiber and the second inorganic fiber, the exhaust gas purifying apparatus is more likely to be provided inexpensively.

In the exhaust gas purifying apparatus according to the embodiment of the present invention, a weight percent of the first inorganic fiber in a surface area of the first main surface of the holding sealing material is larger than a weight percent of the first inorganic fiber in a surface area of the second main surface of the holding sealing material, and the first main surface of the holding sealing material is desirably disposed on the side of the exhaust gas treating body.

In the exhaust gas purifying apparatus according to the embodiment of the present invention, the holding sealing material according to the embodiment of the present invention which has the surface area of the first main surface having a superior heat resistance to that of the surface area of the second main surface is provided between the exhaust gas treating body and the casing, and the first main surface of the holding sealing material is disposed on the side of the exhaust gas treating body where the temperature becomes high due to influx of exhaust gases.

Therefore, in the exhaust gas purifying apparatus according to the embodiment of the present invention, damages such as erosion loss of the holding sealing material is more likely to be prevented from occurring.

In the exhaust gas purifying apparatus according to the embodiment of the present invention, the exhaust gas treating body is desirably a honeycomb filter including the exhaust gas treating body in which either one of the ends of each of cells is sealed.

In the exhaust gas purifying apparatus according to the embodiment of the present invention, exhaust gas flows into cells that open on the exhaust gas inlet side and passes through a cell wall where PM in the exhaust gas is captured and then the exhaust gas flows out through the other cells that open on the exhaust gas outlet side.

Therefore, the exhaust gas purifying apparatus according to the embodiment of the present invention is more likely to remove the PM in the exhaust gas.

In the exhaust gas purifying apparatus according to the embodiment of the present invention, the exhaust gas treating body desirably includes a catalyst.

The exhaust gas purifying apparatus according to the embodiment of the present invention is more likely to purify toxic gas components contained in exhaust gases by allowing the catalyst to contact with the toxic gas components such as CO, HC or NOx contained in exhaust gases.

In the case where the exhaust gas treating body is the honeycomb filter, contact of PM collected on the honeycomb filter with the catalyst is more likely to reduce the activation energy needed for combustion of PM. Therefore, the collected PM is more likely to be burned at a low temperature.

The holding sealing material according to the embodiment of the present invention is more likely to exert high wind erosion resistance, is more likely to have high holding properties, and is more likely to be provided inexpensively.

(First Embodiment)

The following description will discuss one embodiment of the present invention as a first embodiment with reference to the drawings.

First, a structure of the holding sealing material of the present embodiment will be explained.

Figure 2:
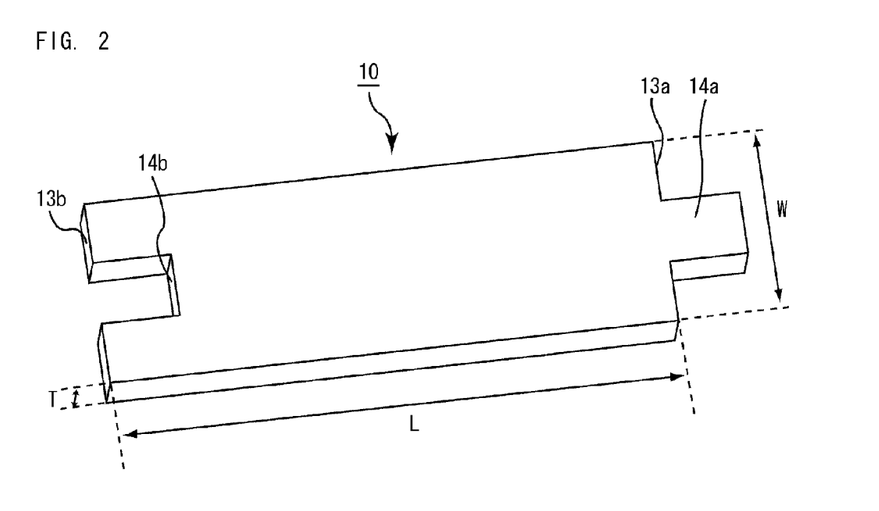
FIG. 2 is a perspective view schematically illustrating the holding sealing material according to one embodiment of the present invention.

FIG. 2 is a perspective view schematically illustrating the holding sealing material of the present embodiment.

The holding sealing material of the present embodiment includes a first inorganic fiber mainly containing alumina and a second inorganic fiber mainly containing silica. As shown in FIG. 2, the holding sealing material has an almost rectangular flat plate shape in plain view with a predetermined length (indicated by arrow L in FIG. 2), a predetermined width (indicated by arrow W in FIG. 2), and a predetermined thickness (indicated by arrow T in FIG. 2).

Moreover, a projected portion 14a is formed on one end face 13a among the end faces 13a and 13b which are parallel to the width direction of the holding sealing material 10. On the other hand, a recessed portion 14b having a shape to be fitted with the projected portion 14a when the holding sealing material 10 is folded and the end face 13a and the end face 13b are made in contact with each other is formed on the other end face 13b.

In the holding sealing material 10 of the present embodiment having the above-mentioned kind of configuration, the first inorganic fiber and the second inorganic fiber are intricately intertwined with each other.

Namely, the holding sealing material 10 of the present embodiment includes the first inorganic fiber and the second inorganic fiber in a coexisting state.

It is to be noted that the first inorganic fiber and the second inorganic fiber are fixed with each other with an organic binder and an inorganic binder interposed therebetween so as to maintain the shape of the holding sealing material 10. When the holding sealing material 10 is used for an exhaust gas purifying apparatus, fixation of the first inorganic fiber and the second inorganic fiber with the inorganic binder allows the holding sealing material 10 to keep the shape thereof, while the organic binder is removed to outside by evaporation or combustion.

Next, the configuration of the exhaust gas purifying apparatus of the present embodiment using the holding sealing material of the present embodiment will be described with reference to FIG. 3A and FIG. 3B.

Figure 3A:
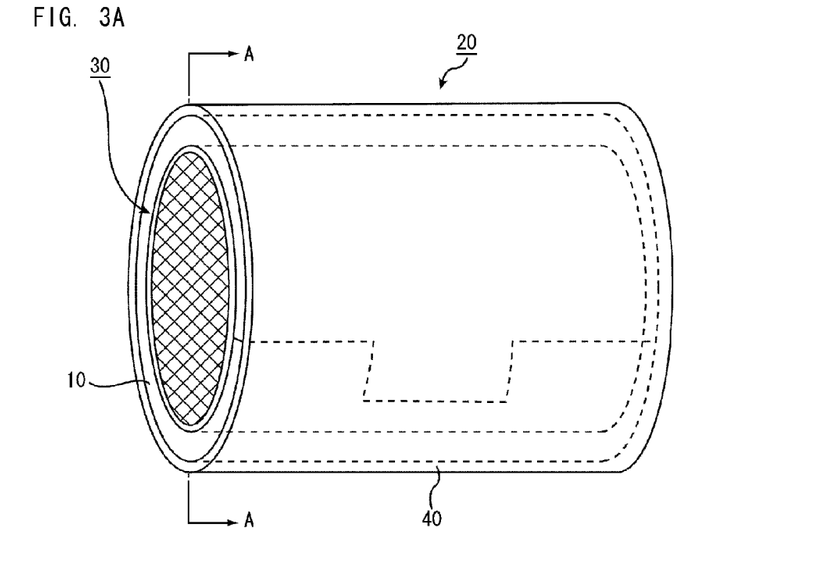
FIG. 3A is a perspective view schematically illustrating an exhaust gas purifying apparatus according to one embodiment of the present invention.
Figure 3B:
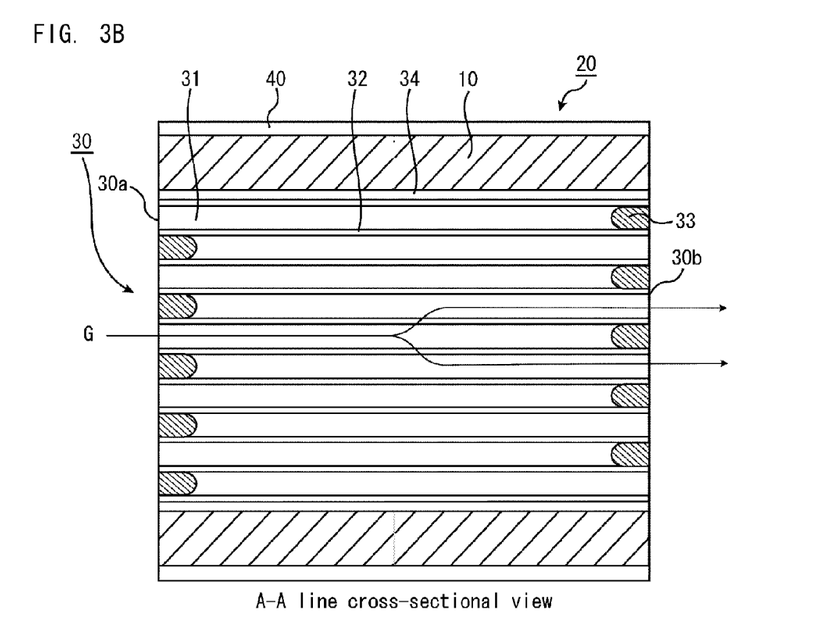
FIG. 3B is an A-A line cross-sectional view of the exhaust gas purifying apparatus illustrated in FIG. 3A.

FIG. 3A is a perspective view schematically illustrating an exhaust gas purifying apparatus of the present embodiment, and FIG. 3B is an A-A line cross-sectional view of the exhaust gas purifying apparatus illustrated in FIG. 3A.

As illustrated in FIG. 3A and FIG. 3B, an exhaust gas purifying apparatus 20 includes an exhaust gas treating body 30 having a longitudinal direction and cell walls 32 extending along the longitudinal direction to define cells 31; a casing 40 configured to accommodate the exhaust gas treating body 30; and a holding sealing material 10 provided between the exhaust gas treating body 30 and the casing 40 and configured to hold the exhaust gas treating body 30.

If needed, to the end portions of the casing 40 are connected: an introducing pipe configured to introduce exhaust gases discharged by internal combustion engines; and an exhaust pipe from which the exhaust gases that have passed through an exhaust gas purifying apparatus are discharged to the outside.

In the exhaust gas purifying apparatus 20 of the present embodiment, as illustrated in FIG. 3B, as the exhaust gas treating body 30, a honeycomb filter is employed in which either one of the ends of each of the cells is sealed with a plug 33.

The following will discuss the case where exhaust gases pass through the exhaust gas purifying apparatus 20 having the above-mentioned configuration with reference to FIG. 3B.

As illustrated in FIG. 3B, the exhaust gas (in FIG. 3B, the exhaust gas is indicated by G and the flow of the exhaust gas is indicated by arrows) discharged from the internal combustion engines and introduced into the exhaust gas purifying apparatus 20 flows into one of cells 31 that opens onto an end face 30a of the exhaust gas inlet side in the honeycomb filter 30, and passes through a cell wall 32 separating the cells 31. At this time, PM in the exhaust gas is captured in the cell wall 32, and as a result, the exhaust gas is purified. The purified exhaust gas flows out through another cell 31 opening onto the end face 30b of the exhaust gas outlet side, and is discharged to the outside.

Figure 4A:
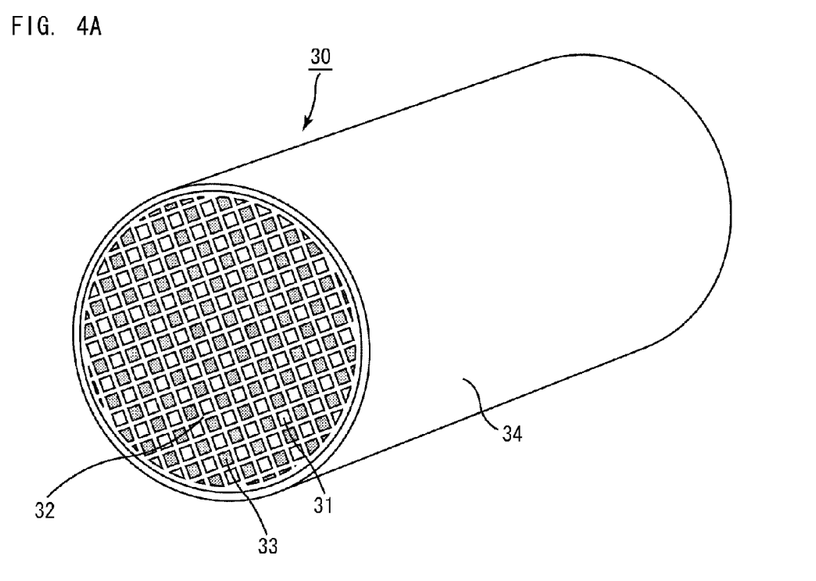
FIG. 4A is a perspective view schematically illustrating a honeycomb filter that configures an exhaust gas purifying apparatus according to one embodiment of the present invention.
Figure 4B:
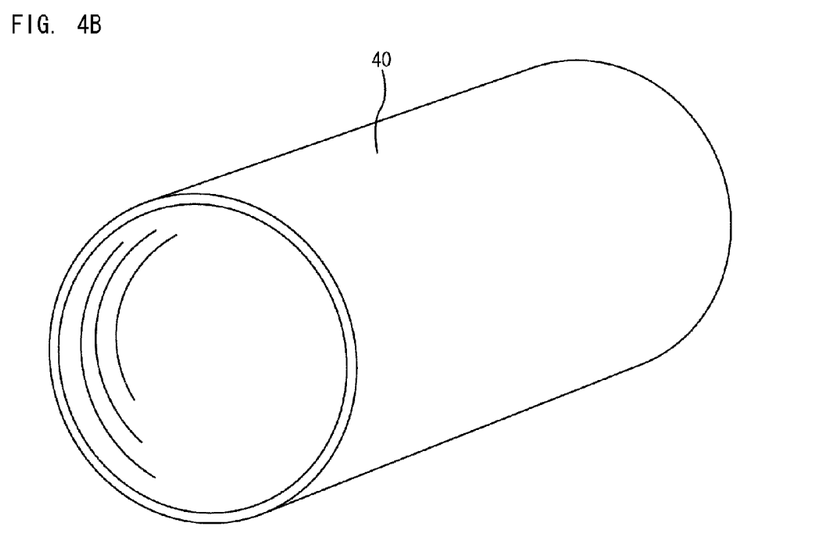
FIG. 4B is a perspective view of a casing that configures the exhaust gas purifying apparatus according to one embodiment of the present invention.

Next, the following will discuss a honeycomb filter and a casing that configure the exhaust gas purifying apparatus 20 with reference to FIG. 4A and FIG. 4B. Here, the configuration of the holding sealing material will be omitted because it has been already stated.

FIG. 4A is a perspective view schematically illustrating a honeycomb filter that configures an exhaust gas purifying apparatus of the first embodiment, and FIG. 4B is a perspective view of a casing that configures an exhaust gas purifying apparatus of the first embodiment.

As illustrated in FIG. 4A, a honeycomb filter 30 mainly includes porous ceramics and has a round pillar shape. Moreover, a sealing material layer 34 is formed on the periphery of the honeycomb filter 30 for the purposes of reinforcing the peripheral portion of the honeycomb filter 30, adjusting the shape of the peripheral portion thereof, and improving the heat insulating property of the honeycomb filter 30.

The internal configuration of the honeycomb filter 30 has been already stated in the description of the exhaust gas purifying apparatus of the present embodiment (see FIG. 3B).

The honeycomb filter 30 may include cordierite and the like, and may be integrally formed as shown in FIG. 4A. Further, the honeycomb filter may be formed by bonding a plurality of honeycomb fired bodies with an adhesive layer mainly containing ceramic interposed therebetween, each of the honeycomb fired bodies having a longitudinal direction and cell walls extending along the longitudinal direction to define cells.

Subsequently, the casing 40 will be described. The casing 40, illustrated in FIG. 4B, is mainly made of metal such as stainless, and it is formed into a circular cylindrical shape. Moreover, its inner diameter is slightly shorter than the diameter of a combination of the honeycomb filter 30 and the holding sealing material 10 wound around the honeycomb filter 30, and its length is virtually the same as the length of the honeycomb filter 30 in the longitudinal direction.

The following description will discuss a method for manufacturing the holding sealing material and the exhaust gas purifying apparatus of the present embodiment.

First, the method for manufacturing the holding sealing material will be discussed.

1. Manufacturing of Holding Sealing Material

The holding sealing material is manufactured according to the following processes.

(1-1) Mixed Solution Preparation Process

An alumina fiber, a silica fiber, an organic binder, an inorganic binder, and water are mixed together in a manner that the content of the inorganic fiber (alumina fiber and silica fiber) reaches a predetermined value, and then the mixture is stirred by a stirrer so as to prepare a mixed solution.

(1-2) Sheet Forming Process

Next, the mixed solution is poured into a molding tank having a mesh for filtration formed at the bottom, and then water in the mixed solution is removed through the mesh so that a mat precursor is manufactured.

(1-3) Heat Compression Process

The mat precursor is heated and compressed at a predetermined condition to manufacture a mat body having a predetermined bulk density. The alumina fiber and the silica fiber are fixed with each other with the organic binder and the inorganic binder interposed therebetween so as to maintain the shape of the mat body.

In this specification, the bulk density means a value obtainable when the weight of the mat body after removal of the organic binder by heating the mat body at 600° C. for a little more than one hour is divided by the volume thereof.

(1-4) Cutting Process

The mat body is cut so that a holding sealing material having a predetermined size is manufactured. In this process, the holding sealing material is cut in a manner that a projected portion is formed in a part of one of the end portions of the holding sealing material and a recessed portion having a shape to be fitted with the projected portion is formed in a part of the other end portion.

2. Manufacturing of Exhaust Gas Purifying Apparatus

A procedure of manufacturing an exhaust gas purifying apparatus will be described below with reference to the drawings.

Figure 5:
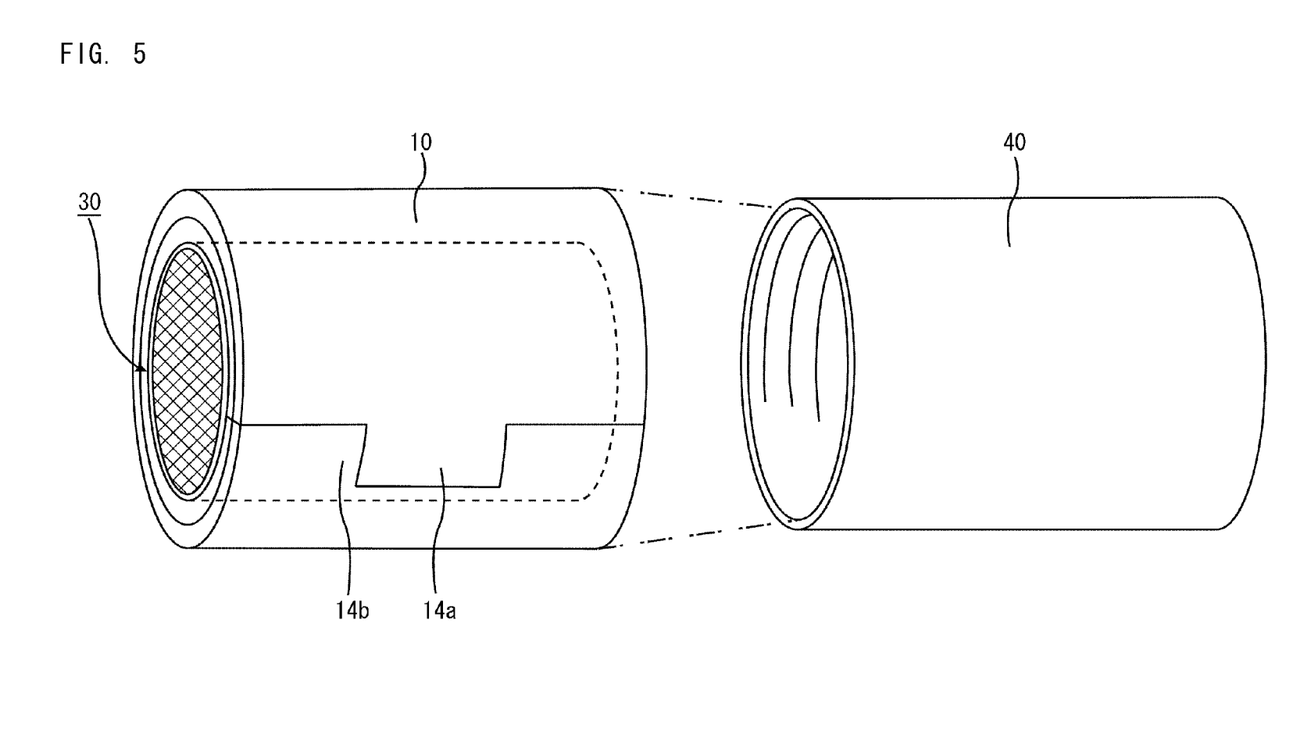
FIG. 5 is a perspective view schematically illustrating a condition of manufacturing the exhaust gas purifying apparatus by using a holding sealing material, the exhaust gas treating body and the casing, which are included in the exhaust gas purifying apparatus according to one embodiment of the present invention.

FIG. 5 is a perspective view schematically illustrating a condition of manufacturing the exhaust gas purifying apparatus by using a holding sealing material, the exhaust gas treating body and the casing, which are included the exhaust gas purifying apparatus of the present embodiment.

(2-1) Press Fit Process

The holding sealing material 10 obtained in the process (1-4) is wound around the periphery of a honeycomb filter 30 having a round-pillar shape manufactured by a known method in a manner that the projected portion 14a and the recessed portion 14b are fitted with each other. Thereafter, as shown in FIG. 5, the honeycomb filter 30 around which the holding sealing material 10 is wound is press-fitted into a cylindrical casing 40 with a predetermined size and made mainly of a metal and the like so that an exhaust gas purifying apparatus is manufactured.

Effects of the holding sealing material and the exhaust gas purifying apparatus of the present embodiment are recited below.

(1) The holding sealing material of the present embodiment includes the first inorganic fiber and the second inorganic fiber in a coexisting state. Therefore, reduction of wind erosion resistance that may occur in the case of the second inorganic fiber alone is compensated by the first inorganic fiber having high wind erosion resistance that is present in a coexisting state. As a result, the wind erosion resistance of the holding sealing material as a whole is improved.

On the other hand, reduction of elasticity that may occur in the case of the first inorganic fiber alone is compensated by the second inorganic fiber having high elasticity that is present in a coexisting state. As a result, the holding sealing material is more likely to show higher holding properties without using a large amount of the first organic fiber and the second organic fiber as compared to a conventionally known holding sealing material. Further, since it is not necessary to use a large amount of the first inorganic fiber and the second inorganic fiber to provide high holding properties with the holding sealing material, the holding sealing material is more likely to be provided inexpensively.

As mentioned earlier, the holding sealing material of the present invention is more likely to exert high wind erosion resistance, is more likely to have high holding properties, and is more likely to be provided inexpensively.

(2) The ratio of the amounts of the first inorganic fiber and the second inorganic fiber in the holding sealing material of the present embodiment is not particularly limited as long as the first inorganic fiber and the second inorganic fiber are included in a coexisting state. However, when the ratio of the amount of the first inorganic fiber relative to the total amount of the first inorganic fiber and the second inorganic fiber is from about 25% to about 75% by weight, the effects described in the above (1) are more likely to be preferably obtained.

The reason for this is as follows. In the case where the ratio of the first inorganic fiber is about 75% by weight or less, the amount of the second inorganic fiber having high elasticity does not become too small and the holding properties of the holding sealing material is less likely to be reduced. On the other hand, in the case where the ratio of the first inorganic fiber is about 25% by weight or more, the amount of the first inorganic fiber having high wind erosion resistance does not become too small and the wind erosion resistance of the holding sealing material is less likely to be reduced.

(3) In the exhaust gas purifying apparatus of the present embodiment, the holding sealing material of the present embodiment is provided between the exhaust gas treating body and the casing. The holding sealing material is more likely to exert a higher wind erosion resistance and also higher holding properties that those of a conventional holding sealing material without using a large amount of the first inorganic fiber and the second inorganic fiber.

For this reason, the exhaust gas purifying apparatus of the present embodiment is less susceptible to wind erosion. Accordingly, coming-off of the exhaust gas treating body is more likely to be prevented from occurring in the exhaust gas purifying apparatus of the present embodiment.

Furthermore, the exhaust gas purifying apparatus is more likely to be provided inexpensively.

(4) In the exhaust gas purifying apparatus of the present embodiment, the exhaust gas treating body included in the exhaust gas purifying apparatus is the honeycomb filter in which either one of the ends of each of cells is sealed.

Therefore, the exhaust gas purifying apparatus of the present embodiment is more likely to remove PM in exhaust gases.

Examples specifically disclosing the first embodiment of the present invention will be described below; however, the present embodiment is not limited to those examples.

EXAMPLE 1

Manufacturing of Holding Sealing Material
A holding sealing material was manufactured according to the following procedure.
(1) Mixed Solution Preparation Process
An amount of 297 g of an alumina fiber (MAFTEC, manufactured by Mitsubishi Chemical Functional Products, Inc.) having a composition of alumina:silica=72:28 (weight ratio), 297 g of a silica fiber having a composition of alumina:silica=5:95 (weight ratio) that had been heat treated, 36 g of an acrylic-based latex, 4.8 g of an alumina sol, and water were mixed so that 0.5% by weight of the inorganic fibers (alumina fiber and silica fiber) was contained in a raw material solution. The resulting solution was stirred for 60 seconds by a stirrer to prepare a mixed solution.
(2) Sheet Forming Process
Next, the mixed solution was poured into a molding tank (length 930 mm×width 515 mm×depth 400 mm) having a mesh for filtration formed at the bottom, and then the water in the mixed solution was removed through the mesh so that a mat precursor was manufactured.
(3) Heat Compression Process
Further, the mat precursor was heated and compressed at 120° C. for 30 minutes to manufacture a mat body having a bulk density of 0.19 g/cm$^3$.
(4) Cutting Process
The mat body was cut so as to manufacture a holding sealing material having a size of length 310 mm×width 110 mm×thickness 6.5 mm, in which a projected portion is formed in a part of one of the end portions and a recessed portion having a shape to be fitted with the projected portion is formed in a part of the other end portion.

The resulting holding sealing material included the alumina fiber and the silica fiber in a coexisting state. Moreover, the ratio of the amount of the alumina fiber relative to the total amount of the alumina fiber and the silica fiber was 50% by weight.

(Wind Erosion Resistance Test)
An apparatus for measuring wind erosion resistance to be used in a wind erosion resistance test will be described below.

The apparatus for measuring wind erosion resistance includes: an upper plate member and a lower plate member which can hold a sample for a wind erosion resistance test at a predetermined pressed density by sandwiching the sample from the upper direction and the lower direction; and an air nozzle which is controllable to continuously blow air provided from outside to a side face of the sample at a predetermined wind pressure. In this specification, pressed density refers to a calculated value obtained by calculating the bulk density of the compressed sample based on the bulk density of the sample before compression. For example, in the case where the sample is compressed to halve the apparent volume, the pressed density should be twice as much as the bulk density of the sample before compression.

A wind erosion resistance test was carried out in the following procedure.

First, the holding sealing material manufactured in Example 1 was cut into a 25 mm square piece to prepare a sample for the wind erosion resistance test.

Next, the sample was sandwiched and held with the upper plate member and the lower plate member with both surfaces of the sample contacting with the upper plate member and the lower plate member, respectively, while the pressed density of the sample was controlled to be 0.3 g/cm$^3$. Further, position of the air nozzle was controlled so that the distance from the side face of the sample to a tip of the air nozzle was set to 3.6 mm. In the above-mentioned state, by blowing air at the wind pressure of 135 kPa to the sample continuously for three hours, wind erosion was caused in the sample. This operation was carried out at a temperature of 700° C.

The depth of pores formed on the side face of the eroded sample from the surface of the sample to the bottom of the pores was measured and set as wind erosion amount (mm).

The result showed that the wind erosion amount of the holding sealing material manufactured in Example 1 was 3 mm.

(Surface Pressure Measurement Test)
An apparatus for measuring surface pressure to be used in a surface pressure measurement test will be described below.

The apparatus for measuring surface pressure includes: a lower metal plate member and an upper metal plate member which are temperature controllable and hold the sample for a surface pressure measurement test respectively from the upper direction and the lower direction; a vertically movable piston; and a sensor which can measure pressure applied to the upper plate member (hereinafter also referred to as surface pressure).

The following description will discuss principles in which the surface pressure is measured by using the apparatus for measuring surface pressure having the above-mentioned configuration.

First, the sample is sandwiched and held with the upper plate member and the lower plate member. Next, the piston is moved downward to move the upper plate member in the lower direction so that the sample is compressed to have a predetermined pressed density. At this point, resilience of the sample makes the sample to return to the normal state from the compressed state, and thus a pressure due to the resilience of the sample is applied to the upper plate member. By measuring the pressure by the sensor, the surface pressure upon compression can be measured.

Next, by moving the piston upward, the upper plate member is moved in the upper direction. At this time, the piston should not be returned to the initial position. This arrangement allows the compression state of the sample to be slightly released. In this state, the sample is not returned to the initial state, and thus the pressure due to the resilience of the sample is applied to the upper plate member. By measuring the pressure with the sensor, the surface pressure at the returned state can be measured.

The surface pressure measurement test was carried out in the following procedures.

The sample for surface pressure measurement test was prepared by punching out the holding sealing material manufactured in Example 1 in a cylindrical shape having a diameter of 1 inch. This sample was placed between the lower plate member and the upper plate member of the apparatus for measuring the surface pressure. In this step, the sample was placed in a manner that both of the surfaces of the holding sealing material respectively make contact with the lower plate member and the upper plate member.

Next, the upper plate member was moved downward so that the sample was compressed until it had the pressed density of 0.33 g/cm$^3$. After compression, the upper plate member was moved upward so that the sample was returned to the normal state until it had the pressed density of 0.30 g/cm$^3$. When setting the above-mentioned compression and return of the sample as one to-and-fro motion, the to-and-fro motion was repeated 1000 times. Here, the repetition of the to-and-fro motion was performed while the temperature of the area near a lower surface of the sample contacting to the lower plate member was raised to 500° C. and the temperature of the area near an upper surface of the sample contacting to the upper plate member was raised to 900° C.

Thereafter, the surface pressure of the sample at the returned state (pressed density: 0.30 g/cm$^3$) when the temperature of the lower surface reached at 170° C. and the temperature of the upper surface reached at 300° C. (hereinafter the surface pressure is also referred to as low-temperature surface pressure) was measured.

Moreover, the surface pressure of the sample at the returned state (pressed density: 0.30 g/cm$^3$) when the temperature of the lower surface reached at 500° C. and the temperature of the upper surface reached at 900° C. (hereinafter the surface pressure is also referred to as high-temperature surface pressure) after completing the 1000$^{th}$ to-and-fro motion was measured.

The result showed that the low-temperature surface pressure of the holding sealing material manufactured in Example 1 was 122.2 kPa and the high-temperature surface pressure of the holding sealing material manufactured in Example 1 was 42.8 kPa.

The measuring temperature for the low-temperature surface pressure was set to the above-mentioned temperature based on the following reason.

Namely, since temperature of exhaust gases is relatively low when a diesel engine or the like is used as internal combustion engine, temperature of the casing goes up to about 170° C. and temperature of the exhaust gas treating body goes up to about 300° C. For this reason, by setting the measuring temperature for the low-temperature surface pressure to the above-mentioned temperature, it is possible to use the lower plate member as a substitute for the casing and to use the upper plate member as a substitute for the exhaust gas treating body. Therefore, it is considered possible to evaluate whether or not the holding sealing material can exert high holding properties when it is used for an exhaust gas purifying apparatus for diesel engine and the like.

On the other hand, the measuring temperature for the high-temperature surface pressure was set to the above-mentioned temperature based on the following reason.

Namely, since temperature of exhaust gases is relatively high when a gasoline engine or the like is used as internal combustion engine, temperature of the casing goes up to about 50° C. and temperature of the exhaust gas treating body goes up to about 900° C. For this reason, by setting the measuring temperature for the high-temperature surface pressure to the above-mentioned temperatures, it is considered possible to evaluate whether or not the holding sealing material can exert high holding properties when it is used for exhaust gas purifying apparatus for gasoline engine and the like.

EXAMPLES 2 AND 3

A holding sealing materials were manufactured in the same manner as in Example 1, except that the total amount of the inorganic fibers (alumina fiber and silica fiber) was 500 g, and the inorganic fibers were blended so that weight ratio of the alumina fiber and the silica fiber were set to the value shown in Table 1 in the process (1) in Example 1.

All the obtained holding sealing materials included the alumina fiber and the silica fiber in a coexisting state and had the same shape and the bulk density as the one manufactured in Example 1.

Moreover, a ratio of an amount of the alumina fiber relative to a total amount of the alumina fiber and the silica fiber was 25% by weight and 75% by weight in the holding sealing materials manufactured in Example 2 and Example 3, respectively.

COMPARATIVE EXAMPLE 1

A holding sealing material was manufactured in the same manner as in Example 1, except that 594 g of the silica fiber that had been heat-treated was used as the inorganic fiber in the process (1) in Example 1.

The obtained holding sealing material included only the silica fiber and had the same shape and the bulk density as the one manufactured in Example 1.

COMPARATIVE EXAMPLE 2

An amount of 297 g of an alumina fiber, 18 g of an acrylic-based latex, 2.4 g of an alumina sol and water were mixed so that 0.5% by weight of the alumina fiber was contained in a raw material solution. The resulting solution was stirred for 60 seconds by a stirrer to prepare a mixed solution.

A mat precursor including only the alumina fiber was manufactured in the same manner as the process (2) in Example 1 by using the mixed solution obtained above.

Next, 297 g of the silica fiber that had been heat-treated, 18 g of an acrylic-based latex, 2.4 g of an alumina sol and water were mixed so that 0.5% by weight of the silica fiber was contained in a raw material solution. The resulting solution was stirred for 60 seconds by a stirrer to prepare a mixed solution.

A mat precursor including only the silica fiber was manufactured in the same manner as the process (2) in Example 1 by using the mixed solution obtained above.

The mat precursor including only the silica fiber was laminated on the mat precursor including the alumina fiber. Thereafter, the same processes as the processes (3) and (4) in Example 1 were performed to manufacture a holding sealing material.

The obtained holding sealing material included two layers of the inorganic fiber layers, namely, the layer including only the alumina fiber and the layer including only the silica fiber. The shape and the bulk density of the holding sealing material were respectively the same with those of the holding sealing material manufactured in Example 1.

It is to be noted that the holding sealing materials of Comparative Examples 1 and 2 were manufactured as objects of comparison to evaluate the wind erosion resistance of the holding sealing materials manufactured in Examples 1 to 3.

COMPARATIVE EXAMPLE 3

A holding sealing material was manufactured in the same manner as in Example 1, except that 594 g of an alumina fiber was used as an inorganic fiber in the process (1) in Example 1.

The obtained holding sealing material included only the alumina fiber and had the same shape and the same bulk density as the one manufactured in Example 1.

COMPARATIVE EXAMPLE 4

A mat precursor including only the alumina fiber was manufactured in the same manner as in Comparative Example 2.

Next, 297 g of a ceramic fiber (IBI-WOOL, manufactured by IBIDEN CO., LTD.) having a composition of alumina:silica=52:48 (weight ratio), 18 g of an acrylic-based latex, 2.4 g of an alumina sol, and water were mixed so that 0.5% by weight of the ceramic fiber was contained in a raw material solution. The resulting solution was stirred for 60 seconds by a stirrer to prepare a mixed solution.

A mat precursor including only the ceramic fiber was manufactured in the same manner as the process (2) in Example 1 by using the mixed solution obtained above.

The mat precursor including only the ceramic fiber was laminated on the mat precursor including only the alumina fiber. Thereafter, the same processes as the processes (3) and (4) in Example 1 were performed to manufacture a holding sealing material.

The obtained holding sealing material included two layers of the inorganic fiber layers, namely, the layer including only the alumina fiber and the layer including only the ceramic fiber. The shape and the bulk density of the holding sealing material were respectively the same with those of the holding sealing material manufactured in Example 1.

It is to be noted that the holding sealing materials of Comparative Examples 3 and 4 were manufactured as objects of comparison to evaluate the low-temperature surface pressure and the high-temperature surface pressure of the holding sealing materials manufactured in Examples 1 to 3.

The wind erosion resistance test and the surface pressure test were performed and also wind erosion amount, and the low-temperature surface pressure and the high-temperature surface pressure were analyzed in the same manner as Example 1 on the holding sealing materials manufactured in Examples 2 and 3 and Comparative Examples 1 to 4.

The results of each Examples and each Comparative Examples were shown in Table 1 with the results of Example 1.

parative Examples 3 and 4. Therefore, when the holding sealing materials described in Examples 1 to 3 are used for an exhaust gas purifying apparatus, it is considered easier to inexpensively provide the holding sealing material having high holding properties.

In consideration of the high low-temperature surface pressure and the high high-temperature surface pressure, it is considered easier to inexpensively provide a holding sealing material having high holding properties regardless of types of an internal combustion engine to which the exhaust gas purifying apparatus is connected.

On the other hand, although the holding sealing material manufactured in Comparative Example 1 had a high low-temperature surface pressure and a high high-temperature surface pressure, since it included only the silica fiber having relatively a low wind erosion resistance among inorganic fibers, the wind erosion resistance was low. Similarly, although the holding sealing material manufactured in Comparative Example 2 had a high low-temperature surface pressure and a high high-temperature surface pressure, since it had a layer including only the silica fiber, the wind erosion resistance was low.

Moreover, since the holding sealing material manufactured in Comparative Example 3 included only the alumina fiber, both of the low-temperature surface pressure and the high-temperature surface pressure were low, although it had high wind erosion resistance. Similarly, since the holding sealing material manufactured in Comparative Example 4 had a layer including only the alumina fiber and a layer including only the silica fiber, both of the low-temperature surface pressure and

TABLE 1

| | Alumina fiber (% by weight) | Silica fiber (% by weight) | Wind erosion amount (mm) | High-temperature surface pressure (kPa) (Note 1) | Low-temperature surface pressure (kPa) (Note 2) |
|---|---|---|---|---|---|
| Example 1 | 50 | 50 | 3 | 42.8 | 122.2 |
| Example 2 | 25 | 75 | 9 | 50.2 | 153.1 |
| Example 3 | 75 | 25 | 2 | 42.5 | 110.7 |
| Comparative Example 1 | Silica fiber only | | 15 | 48.8 | 178.3 |
| Comparative Example 2 | Alumina fiber layer + Silica fiber layer (Two layer structure) | | 15 (Note 3) | 53.5 | 127.1 |
| Comparative Example 3 | Alumina fiber only | | 1.5 | 41.3 | 85.7 |
| Comparative Example 4 | Alumina fiber layer + Ceramic fiber layer (Two layer structure) | | 2 (Note 4) | 40.3 | 64.7 |

(Note 1)
Surface pressure when lower plate member is at 500° C. and upper plate member is at 900° C.
(Note 2)
Surface pressure when lower plate member is at 170° C. and upper plate member is at 300° C.
(Note 3)
Wind erosion amount of silica fiber layer
(Note 4)
Wind erosion amount of ceramic fiber layer The result showed that all the holding sealing materials manufactured in Examples 1 to 3 had a higher wind erosion resistance than that of the holding sealing materials manufactured in Comparative Examples 1 and 2. Therefore, when the holding sealing materials described in Examples 1 to 3 are used for an exhaust gas purifying apparatus, since the holding sealing materials are less susceptible to wind erosion, it is considered easier to prevent the exhaust gas treating body from coming off.

Further, all the holding sealing materials manufactured in Examples 1 to 3 had a higher low-temperature surface pressure and a higher high-temperature surface pressure than those of the holding sealing materials manufactured in Comthe high-pressure surface pressure were low, although the wind erosion resistance was high.

(Second Embodiment)

Next, the following description will discuss one embodiment of the present invention as a second embodiment with reference to the drawings.

Figure 6:
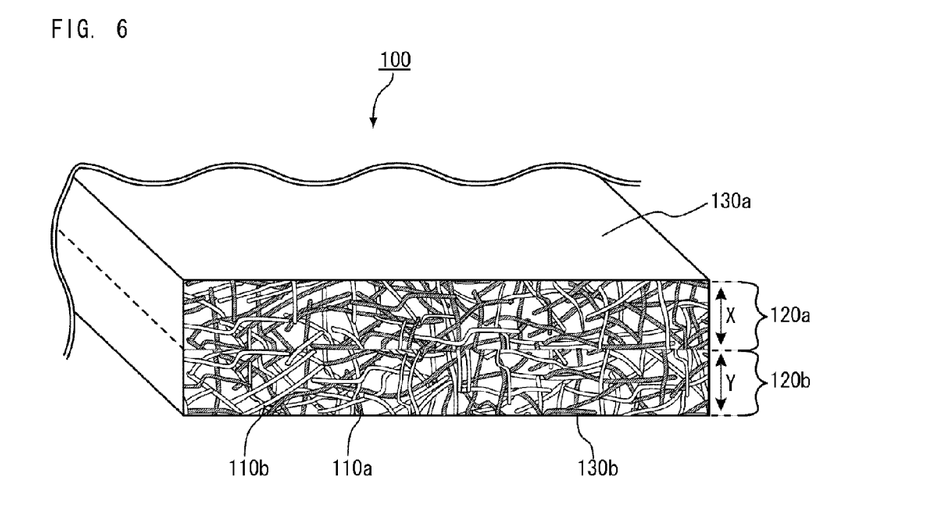
FIG. 6 is a partial cross-sectional perspective view schematically illustrating a cross-section obtained when another example of the holding sealing material according to one embodiment of the present invention is cut along the thickness direction.

FIG. 6 is a partial cross-sectional perspective view schematically illustrating a cross-section obtained when the holding sealing material according to the second embodiment is cut along the thickness direction.

A holding sealing material 100 of the present embodiment has an almost rectangular flat plate shape in plain view and includes a first inorganic fiber 10a and a second inorganic fiber 10b in a coexisting state as similar to the holding sealing material according to the first embodiment. More specifically, the holding sealing material 100 includes a first holding sealing material layer 120a and a second holding sealing material layer 120b, which have almost the same thickness with each other. A weight percent of the first inorganic fiber 10a included in the first holding sealing material 120a is larger than that in the second holding sealing material layer 120b.

For this reason, out of two main surfaces 130a and 130b each having the largest area among surfaces of the holding sealing material 100, a surface area (shown by double-headed arrow X in FIG. 6) including the main surface 130a (hereinafter also referred to as first main surface) on the side of the first holding sealing material layer 120a has a larger weight percent of the first inorganic fiber 10a than a surface area (shown by the double-headed arrow Y in FIG. 6) including the main surface 130b (hereinafter also referred to as second main surface) on the side of the second holding sealing material layer 120b.

The other configurations of the holding sealing material of the present embodiment are the same with the holding sealing material of the first embodiment.

An exhaust gas purifying apparatus of the present embodiment has the same configuration with the exhaust gas purifying apparatus according to the first embodiment, except that the exhaust gas purifying apparatus includes the holding sealing material of the present embodiment and the first main surface of the holding sealing material is disposed on the side of the exhaust gas treating body.

The following description will discuss a method for manufacturing the holding sealing material of the present embodiment.

(1) First, a mixed solution is prepared in the same manner as the process (1-1) in the first embodiment. A first mat precursor which is roughly half as thick as the mat precursor manufactured in the first embodiment is prepared in the same manner as the process (1-2) in the first embodiment by using the above-prepared mixed solution. The first mat precursor is to be the first holding sealing material layer in a holding sealing material manufactured through the following processes.

(2) Next, a mixed solution is prepared in the same manner as the process (1-1) of the first embodiment, except that the alumina fiber and the silica fiber are mixed in a manner that, in a resulting mat precursor, the weight percent of the alumina fiber included in the mat precursor is less than that included in the first mat precursor. A second mat precursor which is roughly a half as thick as the mat precursor manufactured in the first embodiment is manufactured in the same manner as the process (1-2) of the first embodiment by using the above-prepared mixed solution. The second mat precursor is to be the second holding sealing material layer in the holding sealing material manufactured through the following processes.

(3) The first mat precursor is laminated on the second mat precursor, and then the resulting laminated mat precursors are heated and compressed at a predetermined condition so that a laminated mat body is manufactured.

(4) Lastly, the laminated mat body is cut into a predetermined size to manufacture a holding sealing material.

In the thus manufactured holding sealing material, the first holding sealing material layer is laminated on the second sealing material layer.

Further, a weight percent of the alumina fiber in the surface area of the first main surface is larger than that in the surface area of the second main surface.

Next, the following description will discuss a method for manufacturing the exhaust gas purifying apparatus of the present embodiment.

According to the method for manufacturing the exhaust gas purifying apparatus of the present embodiment, an exhaust gas purifying apparatus of the present embodiment is manufactured in the same manner as the method for manufacturing the exhaust gas purifying apparatus of the first embodiment, except that the first main surface among the surfaces of the holding sealing material of the present embodiment makes contact with the honeycomb filter upon winding the holding sealing material around the honeycomb filter.

In the above-mentioned second embodiment, the effects (1) to (4) described in the first embodiment can be exerted.

Additionally, an effect mentioned below can also be exerted.

(5) The holding sealing material of the present embodiment has the surface area of the first main surface including a larger amount of the alumina fiber than that in the surface area of the second main surface. The heat resistance of the surface area of the first main surface is superior to that of the surface area of the second main surface.

Therefore, in the exhaust gas purifying apparatus of the present embodiment in which the first main surface of the holding sealing material of the present embodiment is placed on the side of the honeycomb filter where the temperature becomes high due to influx of exhaust gases, damages such as erosion loss of the holding sealing material are more likely to be prevented from occurring.

An example specifically disclosing the second embodiment of the present embodiment will be described below; however, the present embodiment is not limited to this Example.

EXAMPLE 4

(1) An amount of 222.7 g of an alumina fiber, 74.3 g of a heat-treated silica fiber, 18 g of an acrylic-based latex, 2.4 g of an alumina sol, and a water were mixed so that 0.5% by weight in total of the alumina fiber and the silica fiber were contained in a raw material solution. The resulting solution was stirred for 60 seconds by a stirrer to prepare a mixed solution.

(2) The sheet forming process was performed by using the thus obtained mixed solution in the same manner as the process (2) in Example 1 so that a first mat precursor in which the alumina fiber and the silica fiber were present in a coexisting state with the weight percent of the alumina fiber being larger than that of the silica fiber was manufactured.

(3) Next, 74.3 g of an alumina fiber, 222.7 g of a heat-treated silica fiber, 18 g of an organic binder, 2.4 g of an inorganic binder, and water were mixed so that 0.5% by weight of the alumina fiber was contained in a raw material solution. The resulting solution was stirred for 60 seconds by a stirrer to prepare a mixed solution.

(4) The sheet forming process was performed by using the thus obtained mixed solution in the same manner as the process (2) in Example 1 so that a second mat precursor in which the alumina fiber and the silica fiber were present in a coexisting state with the weight percent of the silica fiber being larger than that of the alumina fiber was manufactured.

(5) The first mat precursor was laminated on the second mat precursor, and then the resulting laminated mat precursor was heated and compressed at 120° C. for 30 minutes so that a laminated mat body was manufactured.

(6) Lastly, cutting process was performed on the laminated mat body in the same manner as the process (4) in Example 1 so that a holding sealing material was manufactured.

In the obtained holding sealing material, the alumina fiber and the silica fiber were present in a coexisting state, and the first holding sealing material layer was laminated on the second holding sealing material layer. Further, the holding sealing material layer has the same shape and the same bulk density with those in Example 1. Moreover, in the holding sealing material as a whole, the ratio of the alumina fiber relative to the total amount of the alumina fiber and the silica fiber was 50% by weight. Furthermore, a weight percent of the alumina fiber included in the surface area of the first main surface among surfaces of the holding sealing material was larger than that in the surface area of the second main surface.

The wind erosion resistance test and the surface pressure test were performed on the holding sealing material manufactured in Example 4 in the same manner as in Example 1 so as to evaluate the wind erosion amount, and the low-temperature surface pressure and the high-temperature surface pressure.

The result showed that the amount of wind erosion was 2 mm when the first main surface was eroded, and the amount of wind erosion was 9 mm when the second main surface was eroded.

Moreover, the low-temperature surface pressure and the high-temperature surface pressure were 122.7 kPa and 48.1 kPa, respectively. Upon measuring the low-temperature surface pressure and the high-temperature surface pressure, a sample was placed in a manner that the first main surface made contact with the upper plate member and the second main surface made contact with the lower plate member.

The result showed that the holding sealing material manufactured in Example 4 has a higher wind erosion resistance than that of the holding sealing materials manufactured in Comparative Examples 1 and 2 due to inclusion of the alumina fiber. Therefore, in the case where the holding sealing material described in Example 4 is used for the exhaust gas purifying apparatus, the holding sealing material may be less susceptible to wind erosion and the exhaust gas treating body is more likely to be prevented from coming off.

Furthermore, the holding sealing material manufactured in Example 4 could have a higher low-temperature surface pressure and a higher high-temperature surface pressure due to presence of the mixed silica fiber than those of the holding sealing material manufactured in Comparative Examples 3 and 4. Therefore, in the case where the holding sealing material manufactured in Example 4 is used for the exhaust gas purifying apparatus, the holding sealing material having high holding properties is more likely to be provided inexpensively.

Furthermore, a weight percent of the alumina fiber in the surface area of the first main surface is larger than that in the surface area of the second main surface among surfaces of the holding sealing material manufactured in Example 4, and thus the surface area of the first main surface has a higher heat resistance. Therefore, when using the holding sealing material of Example 4 for an exhaust gas purifying apparatus, damages such as erosion loss of the holding sealing material are more likely to be prevented from occurring by disposing the first main surface on the side of the honeycomb filter where the temperature becomes high due to influx of exhaust gases.

(Third Embodiment)

Next, the following description will discuss one embodiment of the present invention as a third embodiment.

A holding sealing material and an exhaust gas purifying apparatus of the present embodiment have the same configuration with the holding sealing material and the exhaust gas purifying apparatus according to the first embodiment, except that a catalyst such as platinum is supported on the honeycomb filter of the exhaust gas purifying apparatus of the first embodiment.

In the method for manufacturing the exhaust gas purifying apparatus according to the present embodiment, examples of a method for applying a catalyst to the honeycomb filter include a method in which the honeycomb filter is impregnated with a solution of diamine dinitro platinum nitric acid ($[Pt(NH_3)_2(NO_2)_2]HNO_3$) and the like and then heated, and the like.

In the present embodiment, the effects (1) to (4) described in the first embodiment can be exerted.

Additionally, an effect mentioned below can also be exerted.

(6) In the exhaust gas purifying apparatus of the present embodiment, a honeycomb filter having a catalyst supported thereon is disposed inside the casing.

Therefore, by making PM captured in the honeycomb filter contact with the catalyst, the captured PM is more likely to be burned at a lower temperature. Accordingly, the exhaust gas purifying apparatus of the third embodiment is more likely to efficiently remove the PM in exhaust gases.

(Fourth Embodiment)

Next, the following description will discuss one embodiment of the present invention as a fourth embodiment.

A holding sealing material and an exhaust gas purifying apparatus according to the present embodiment have the same configuration with the holding sealing material and the exhaust gas purifying apparatus of the first embodiment, except that either one of the ends of each of cells is not sealed in the honeycomb filter in the exhaust gas treating body, and the exhaust gas treating body further includes a catalyst.

In the method for manufacturing the exhaust gas purifying apparatus of the present embodiment, the method for applying a catalyst to the exhaust gas treating body may be the same with the method for applying a catalyst to the honeycomb filter of the exhaust gas purifying apparatus according the third embodiment. Moreover, the catalyst to be used in the present embodiment may be the same with the catalyst explained in the third embodiment.

In the present embodiment, the effects (1) to (3) described in the first embodiment can be exerted.

Additionally, an effect mentioned below can also be exerted.

(7) In the exhaust gas purifying apparatus according to the present embodiment, the exhaust gas treating body includes a catalyst.

Therefore, toxic gas components contained in exhaust gases are more likely to be converted by allowing the catalyst to contact with toxic gas components contained in exhaust gases.

(Other Embodiments)

The recessed portion and the projected portion formed on end faces of the holding sealing material according to an embodiment of the present invention are not particularly limited and may have any shape as long as the recessed portion and the projected portion fit with each other. Moreover, on the end faces of the holding sealing material, a pair of the recessed portion and the projected portion may be formed as shown in FIG. 2, or plural pairs of respectively fitted recessed portions and projected portions may be formed. It is to be noted that the recessed portion and the projected portion are not necessarily formed.

In the holding sealing material according to the embodiment of the present invention, an average fiber length of the first inorganic fiber is preferably from about 0.2 mm to about 20 mm and more preferably from about 1 mm to about 10 mm.

On the other hand, an average fiber length of the second inorganic fiber is preferably from about 1 mm to about 20 mm and more preferably from about 3 mm to about 10 mm.

In the holding sealing material according to the embodiment of the present invention, an average fiber diameter of the first inorganic fiber is preferably from about 1 μm to about 15 μm and more preferably from about 3 μm to about 10 μm.

On the other hand, an average fiber diameter of the second inorganic fiber is preferably from about 3 μm to about 20 μm and more preferably from about 5 μm to about 12 μm.

The amount of the organic binder contained in the holding sealing material according to the embodiment of the present invention is preferably from about 0.5% by weight to about 12.0% by weight and more preferably from about 0.5% by weight to about 6.0% by weight. When the amount of the organic binder in the holding sealing material is about 0.5% by weight or more, the inorganic fibers are more likely to be bonded easily, and thus the inorganic fibers forming the holding sealing material is less likely to come off. On the other hand, In the case of using holding sealing material having the amount of the binder of about 12.0% by weight or less for an exhaust gas purifying apparatus, the amount of the organic components in exhaust gases to be emitted is less likely to be increased, and thus a burden is less likely to be imposed on the environment.

Although not particularly limited, the weight per square meter of the holding sealing material according to the embodiment of the present invention is preferably from about 800 g/m$^2$ to about 3200 g/m$^2$ and more preferably from about 1000 g/m$^2$ to about 3000 g/m$^2$. Although not particularly limited, the bulk density of the holding sealing material is preferably from about 0.15 g/cm$^3$ to about 0.30 g/cm$^3$.

Although not particularly limited, the thickness of the holding sealing material according to the embodiment of the present invention is preferably from about 6 mm to about 20 mm.

The organic binder used for manufacturing the holding sealing material according to the embodiment of the present invention is not limited to the above-mentioned acrylic-based resin, and examples thereof include: rubbers such as acrylic rubber; water-soluble organic polymers such as carboxymethyl cellulose or polyvinyl alcohol; thermoplastic resins such as styrene resin; thermosetting resins such as epoxy resin; and the like. Particularly preferred examples among these are acrylic rubber, acrylonitrile-butadiene rubber, and styrene-butadiene rubber.

A liquid containing the above-mentioned organic binder may include a plurality of kinds of the above-mentioned organic binders.

Examples of the organic binder liquid include: a latex obtained by dispersing the above-mentioned organic binder in water; a solution in which the above-mentioned binder is dissolved in water or an organic solvent; and the like.

In the case where the holding sealing material according to the embodiment of the present invention includes the first holding sealing material layer and the second holding sealing material layer, the thickness of the first holding sealing material layer and the second holding sealing material layer may be roughly the same with each other as mentioned earlier, or the ratio of the thickness between the first holding sealing material layer and the second holding sealing material layer may be in the range of about (5:95) to about (95:5).

In the case where the thickness of the first holding sealing material layer is the above-mentioned lower limit value or more and the thickness of the second holding sealing material layer is the above-mentioned upper limit value or less, the amount of the first inorganic fiber in the surface area of the first main surface is sufficiently large and thus heat resistance of the surface area of the first main surface is less likely to be reduced.

On the other hand, in the case where the thickness of the first holding sealing material layer is the above-mentioned upper limit value or less and the thickness of the second holding sealing material layer is the above-mentioned lower limit value or more, the amount of the first inorganic fiber in the holding sealing material as a whole is less likely to be too large and thus elasticity of the holding sealing material is less likely to be decreased.

The holding sealing material according to the embodiment of the present invention in which a weight percent of the first organic fiber in the surface area of the first main surface is larger than that in the surface area of the second main surface is not limited to a holding sealing material including two layers of holding sealing material layers such as the above-mentioned holding sealing material including the first holding sealing material layer and the second holding sealing material layer. The holding sealing material may include a plurality of holding sealing material layers.

Further, the holding sealing material may have a configuration in which the ratio of the first inorganic fiber and the second inorganic fiber included therein stepwise shifts so that an amount of the first inorganic fiber increases from the second main surface side to the first main surface side, without including a plurality of holding sealing material layers.

The inorganic binder used for manufacturing the holding sealing material according to the embodiment of the present invention is not limited to the above-mentioned alumina sol and may be silica sol and the like.

In the method for manufacturing the holding sealing material according to the embodiment of the present invention, in the case where a mat body containing water is heated and compressed, it is preferable to perform drying at a temperature of from about 100° C. to about 220° C. With a temperature of 100° C. or higher, a drying time is less likely to be too long, and thus productivity is less likely to be reduced. On the other hand, with a temperature of about 220° C. or less, degradation of the organic binder is less likely to occur. As a result, the inorganic fibers configuring the holding sealing material are more likely to be bonded easily with each other and thus coming off of the inorganic fibers is less likely to be caused.

The material for the casing forming one component of the exhaust gas purifying apparatus according to the embodiment of the present invention is not particularly limited as long as it is a heat-resistant metal, and specific examples thereof include metals, such as stainless steel, aluminum and iron.

Examples of the casing include a casing manufactured by splitting a round pillar-shaped casing along the longitudinal direction into a plurality of casing pieces (i.e. clamshell), a round pillar-shaped casing with a C-shaped or U-shaped cross section having only one slit (opening) extending along the longitudinal direction, a metal plate which forms a round pillar-shaped casing when wound and tightened on the periphery of the holding sealing material which has been wound around the exhaust gas treating body, and the like.

In the case where the exhaust gas purifying apparatus is manufactured by using the clamshell-shaped casing, the exhaust gas treating body is placed on one of the casing pieces and then the other casing pieces are assembled to the one casing pieces. Thereafter, in this state, each of the casing pieces is connected by welding and the like so that the exhaust gas purifying apparatus can be manufactured.

In the case where the exhaust gas purifying apparatus is manufactured by using a metal plate which is to form the casing, what is called a winding-and-tightening method may be used to manufacture the exhaust gas purifying apparatus. According to this method, after rolling and tightening the metal plate on the periphery of the holding sealing material wound around the exhaust gas treating body, the end portions of the metal plate are bonded with each other by welding and the like to form a round pillar-shaped casing.

In a case where the exhaust gas purifying apparatus is manufactured by using the round pillar-shaped casing, what is called a sizing method may be used to manufacture the exhaust gas purifying apparatus, in addition to the method including the above-mentioned press-fitting process. According to this method, after the exhaust gas treating body with a holding sealing material wound therearound has been inserted into the casing having an inner diameter larger than the diameter of a combined body of the exhaust gas treating body with a holding sealing material wound therearound, the casing is compressed from the peripheral side by a pressing machine or the like.

The catalyst to be supported on the exhaust gas treating body configuring the exhaust gas purifying apparatus according to the embodiment of the present invention is not limited to platinum as mentioned above. Examples of the catalyst include: noble metals such as palladium and rhodium; alkali metals such as potassium and sodium; alkaline earth metals such as barium; metal oxides; and the like. These catalysts can be used alone or in combination of two or more.

In addition, the metal oxide is not particularly limited as long as it can lower the burning temperature of PM, and examples thereof include $CeO_2$, $ZrO_2$, $FeO_2$, $Fe_2O_3$, $CuO$, $CuO_2$, $Mn_2O_3$, $MnO$, complex oxides indicated by a composition formula $A_nB_{1-n}CO_3$ (in the formula, A is La, Nd, Sm, Eu, Gd, Ce, Pr, Pm or Y; B is an alkali metal or alkaline earth metal; C is Mn, Co, Fe or Ni; and $0 \leq n \leq 1$), and the like.

Each of these catalysts may be used alone, or two or more kinds of these may be used in combination; however, the catalyst desirably contains at least $CeO_2$.

By supporting a metal oxide of this kind, the burning temperature of PM is more likely to be lowered.

As the method for applying a catalyst to the exhaust gas treating body, a method including forming a catalyst supporting layer consisting of an alumina film and applying a catalyst to the alumina film and the like may be exemplified, in addition to the method in which the exhaust gas treating body is impregnated with a solution containing a catalyst and then heated as mentioned above.

Examples of the method for forming the alumina film include: a method in which the exhaust gas treating body is impregnated with a solution of a metal compound containing aluminum such as $Al(NO_3)_3$ and then heated; a method in which the exhaust gas treating body is impregnated with a solution containing alumina powder and then heated; and the like.

Examples of the method for applying catalyst to the alumina film include: a method in which the exhaust gas treating body is impregnated with a solution containing a noble metal, an alkaline metal, an alkaline earth metal, and a metal oxide, and the like, and then heated; and the like.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A holding sealing material comprising:
    a mat body comprising:
        a first inorganic fiber containing about 60% by weight or more of alumina; and
        a second inorganic fiber containing about 67% by weight or more of silica, the first inorganic fiber and the second inorganic fiber being in a mixed state;
    a first holding sealing material layer located on a side of a first main surface of the holding sealing material; and
    a second holding sealing material layer located on a side of a second main surface of the holding sealing material, wherein
    the first inorganic fiber and the second inorganic fiber are intertwined with each other in random directions of the mat body over the holding sealing material as a whole,
    a weight percent of said first inorganic fiber in a surface area of the first main surface of the holding sealing material is larger than a weight percent of said first inorganic fiber in a surface area of the second main surface of the holding sealing material,
    said first inorganic fiber is more included in said first holding sealing material layer than in said second holding sealing material layer, and
    said second inorganic fiber is more included in said second holding sealing material layer than in said first holding sealing material layer.

2. The holding sealing material according to claim 1, wherein
    a ratio of an amount of said first inorganic fiber relative to a total amount of said first inorganic fiber and said second inorganic fiber is from about 25% by weight to about 75% by weight.

3. The holding sealing material according to claim 1, wherein
    a thickness of said first holding sealing material layer is substantially same as a thickness of said second holding sealing material layer.

4. The holding sealing material according to claim 1, wherein
    a ratio of the thickness between said first holding sealing material layer and said second holding sealing material layer is from about (5:95) to about (95:5).

5. The holding sealing material according to claim 1, wherein
    said first inorganic fiber and said second inorganic fiber are fixed with each other with an organic binder and an inorganic binder provided between the first inorganic fiber and the second inorganic fiber.

6. The holding sealing material according to claim 1, wherein
    an average fiber length of said first inorganic fiber is from about 0.2 mm to about 20 mm, and an average fiber length of said second inorganic fiber is from about 1 mm to about 20 mm.

7. The holding sealing material according to claim 1, wherein
    an average fiber diameter of said first inorganic fiber is from about 1 µm to about 15 µm, and an average fiber diameter of said second inorganic fiber is from about 3 µm to about 20 µm.

8. An exhaust gas purifying apparatus comprising:
an exhaust gas treating body having a longitudinal direction and cell walls extending along the longitudinal direction to define cells;
a casing accommodating said exhaust gas treating body; and
a holding sealing material provided between said exhaust gas treating body and said casing to hold said exhaust gas treating body, wherein
said holding sealing material has a mat body and comprises a first inorganic fiber containing about 60% by weight or more of alumina, and a second inorganic fiber containing about 67% by weight or more of silica, the first inorganic fiber and the second inorganic fiber being in a mixed state,
the first inorganic fiber and the second inorganic fiber are intertwined with each other in random directions of the mat body over the holding sealing material as a whole,
a weight percent of said first inorganic fiber in a surface area of a first main surface of said holding sealing material is larger than a weight percent of said first inorganic fiber in a surface area of a second main surface of said holding sealing material,
said first main surface of the holding sealing material is disposed on the side of said exhaust gas treating body,
the holding sealing material comprises a first holding sealing material layer located on a side of said first main surface and a second holding sealing material layer located on a side of said second main surface,
said first inorganic fiber is more included in said first holding sealing material layer than in said second holding sealing material layer, and
said second inorganic fiber is more included in said second holding sealing material layer than in said first holding sealing material layer.

9. The exhaust gas purifying apparatus according to claim 8, wherein
a thickness of said first holding sealing material layer is substantially same as a thickness of said second holding sealing material layer.

10. The exhaust gas purifying apparatus according to claim 8, wherein
a ratio of the thickness between said first holding sealing material layer and said second holding sealing material layer is from about (5:95) to about (95:5).

11. The exhaust gas purifying apparatus according to claim 8, wherein
said exhaust gas treating body is a honeycomb filter comprising said exhaust gas treating body in which either one of the ends of each of cells is sealed.

12. The exhaust gas purifying apparatus according to claim 11, wherein
said honeycomb filter is integrally formed.

13. The exhaust gas purifying apparatus according to claim 11, wherein
said honeycomb filter is formed by bonding a plurality of honeycomb fired bodies with an adhesive layer provided between the plurality of honeycomb fired bodies.

14. The exhaust gas purifying apparatus according to claim 8, wherein
said exhaust gas treating body further comprises a catalyst.

15. The exhaust gas purifying apparatus according to claim 8, wherein
a ratio of an amount of said first inorganic fiber relative to a total amount of said first inorganic fiber and said second inorganic fiber is from about 25% by weight to about 75% by weight.

16. The exhaust gas purifying apparatus according to claim 8, wherein said first inorganic fiber and said second inorganic fiber are fixed with each other with an organic binder and an inorganic binder provided between the first inorganic fiber and the second inorganic fiber.

17. The exhaust gas purifying apparatus according to claim 8, wherein
an average fiber length of said first inorganic fiber is from about 0.2 mm to about 20 mm, and an average fiber length of said second inorganic fiber is from about 1 mm to about 20 mm.

18. The exhaust gas purifying apparatus according to claim 8, wherein
an average fiber diameter of said first inorganic fiber is from about 1 μm to about 15 μm, and an average fiber diameter of said second inorganic fiber is from about 3 μm to about 20 μm.

19. The holding sealing material according to claim 1, wherein
the first inorganic fiber contains about 70% by weight or more of alumina.

20. The holding sealing material according to claim 1, wherein
the second inorganic fiber contains about 90% by weight or more of silica.

21. The exhaust gas purifying apparatus according to claim 8, wherein
the first inorganic fiber contains about 70% by weight or more of alumina.

22. The exhaust gas purifying apparatus according to claim 8, wherein
the second inorganic fiber contains about 90% by weight or more of silica.

23. The holding sealing material according to claim 1, wherein the first inorganic fiber and the second inorganic fiber are intertwined with each other over an entirety of an internal structure of the mat body.

24. The exhaust gas purifying apparatus according to claim 8, wherein the first inorganic fiber and the second inorganic fiber are intertwined with each other over an entirety of an internal structure of the mat body.

* * * * *